(12) United States Patent
Bernstein

(10) Patent No.: US 6,298,335 B1
(45) Date of Patent: Oct. 2, 2001

(54) METHOD OF CONTROLLING PAYMENT OF DEBTS

(76) Inventor: Robert Bernstein, 3229 Wilmette Ave., Wilmette, IL (US) 60091

( * ) Notice: Subject to any disclaimer, the term of this patent is extended or adjusted under 35 U.S.C. 154(b) by 0 days.

(21) Appl. No.: 09/195,467

(22) Filed: Nov. 18, 1998

Related U.S. Application Data

(63) Continuation-in-part of application No. 08/779,923, filed on Jan. 6, 1997, now Pat. No. 5,915,023, which is a continuation-in-part of application No. 08/369,749, filed on Jan. 6, 1995, now Pat. No. 5,591,949.

(51) Int. Cl.$^7$ .................................................... G06F 17/60

(52) U.S. Cl. ............................... 705/40; 705/34; 705/39; 705/42; 705/78

(58) Field of Search ................................. 705/1, 35, 34, 705/39, 40, 53, 78, 42; 235/380

(56) References Cited

U.S. PATENT DOCUMENTS

| | | | |
|---|---|---|---|
| 4,823,264 | * | 4/1989 | Deming .................................. 705/39 |
| 5,465,206 | * | 11/1995 | Hilt et al. ............................... 705/40 |
| 5,699,528 | * | 12/1997 | Hogan .................................... 705/40 |
| 5,742,845 | * | 4/1998 | Wagner .................................. 710/11 |
| 5,793,027 | * | 8/1998 | Baik ..................................... 235/380 |
| 5,870,721 | * | 2/1999 | Norris .................................... 705/38 |
| 5,870,724 | * | 2/1999 | Lawlor et al. .......................... 705/42 |
| 5,873,072 | * | 2/1999 | Kight et al. ............................. 705/40 |
| 5,878,141 | * | 3/1999 | Daly et al. .............................. 380/25 |
| 5,903,881 | * | 5/1999 | Schrader et al. ....................... 705/42 |
| 5,920,847 | * | 7/1999 | Kolling et al. ........................ 705/40 |
| 5,956,700 | * | 9/1999 | Landry .................................. 705/40 |
| 5,983,200 | * | 11/1999 | Slotznick .............................. 705/26 |
| 5,984,191 | * | 11/1999 | Chapin, Jr. ........................... 235/493 |
| 6,021,202 | * | 2/2000 | Anderson et al. .................... 705/54 |
| 6,029,150 | * | 2/2000 | Kravitz .................................. 705/39 |
| 6,032,137 | * | 2/2000 | Ballard ................................... 705/75 |
| 6,035,288 | * | 3/2000 | Solomon ............................... 705/37 |
| 6,038,542 | * | 3/2000 | Ruckdashel ............................ 705/9 |
| 6,041,315 | * | 3/2000 | Pollin .................................... 705/45 |
| 6,049,786 | * | 4/2000 | Smorodinsky ........................ 705/40 |
| 6,052,671 | * | 4/2000 | Crooks et al. ......................... 75/34 |
| 6,064,987 | * | 5/2000 | Walker et al. ........................ 705/38 |
| 6,070,150 | * | 5/2000 | Remington et al. .................. 705/34 |
| 6,081,790 | * | 6/2000 | Rosen .................................... 705/40 |
| 6,092,053 | * | 7/2000 | Boesch et al. ........................ 705/26 |
| 6,119,106 | * | 9/2000 | Mersky et al. ........................ 705/40 |
| 6,125,354 | * | 9/2000 | MacFarlane et al. ................. 705/34 |
| 6,128,602 | * | 10/2000 | Northington et al. ................ 705/35 |
| 6,128,603 | * | 10/2000 | Dent et al. ............................. 705/40 |

FOREIGN PATENT DOCUMENTS

0793206 * 9/1997 (EP) .

OTHER PUBLICATIONS

31 CFR 103.38, current through Apr. 14, 2000 issue of the Federal Register, last redesignated Aug. 26, 1989, May 2000.*

Wire Transfer, http://fnbabilene.com/htm;/body_wire_transfers.htm, Aug. 1998.*

AltaVista search results, http://www.altavista.com/cgi-bin/query?p...8&d1=18%2f11%2f98&q=wire+transfer&stq=10, May 2000.*

(List continued on next page.)

Primary Examiner—Vincent Millin
Assistant Examiner—Nicholas David Rosen
(74) Attorney, Agent, or Firm—Welsh & Katz, Ltd.

(57) ABSTRACT

A method and apparatus are provided for executing payment of a debt by a person to a payee. The method includes the steps of negotiating payment terms with the payee and entering the negotiated payment terms into a payment scheduler. The method further includes the steps of determining by the scheduler that the payment is due on the debt in accordance with the payment terms, electronically instructing a third party to pay the debt due and electronically transferring a receipt of the payment to the person and payee and to a database of the person in a secure location, remote from the person.

23 Claims, 1 Drawing Sheet

OTHER PUBLICATIONS de Caux, TMA Journal, vol. 16, No. 2, pp. 33–36, "European payment and collection methods," May/Apr. 1996.*

Electronic Buyers News, No. 1038, p. 1, "Cashing in on Smart Cards"Dec. 23, 1996.*

McAndrews, Business Review, "Making Payments on the Internet," Jan./Feb. 1997, pp. 3–14.*

Kogan, Management Accounting, vol. 79, No. 3, pp. 26–30, "Management Accounting in the Era of Electronic Commerce," Sep. 1996, 1997.*

Crone, Journal of Retail Banking Services, vol. 20, No. 2, pp. 55, "Internet Bill Presentment and Payment," Summer 1998.*

Creed, A., "NETS Launches E–Billing Service for Singapore Nov. 16, 1998," Newsbytes.*

Santo, Brian; "The NetBill Electronic Commerce Project"; Mar. 20, 1995; pp 1–14; Electronic Engineering Times.*

* cited by examiner

METHOD OF CONTROLLING PAYMENT OF DEBTS

This application is a continuation in part of Ser. No. 08/779,923 filed Nov. 6, 1997, now Pat. No. 5,905,023, which is a continuation-in-part of Ser. No. 08/369,749 filed Jan. 6, 1995 now Pat. No. 5,591,949.

FIELD OF THE INVENTION

The field of the invention relates to the payment of debts and more particularly to automated methods of payment of debts.

BACKGROUND OF THE INVENTION

Devices for making purchases without the necessity of cash are known. Such devices range from pre-loaded debit cards (e.g., farecards on public transportation systems to credit cards. While such devices are similar in some regards, they differ in others. The devices are similar in that they are typically constructed of plastic with a magnetic stripe on one side or the other. They differ in that a farecard is altered during use while a credit card is not.

The farecard is altered during use in that a numerical value (e.g., a dollar value or a number of bus rides) stored on the card is changed during use. Each time that the card is used, a value indicative of the value of the use is subtracted from the value stored on the farecard and a new, lesser value is stored on the farecard in place of the original value.

A credit card, instead of storing a numerical suggestion of value on the magnetic stripe of the credit card, provides a promise of future payment of an incurred debt from an authorized user of the credit card. Such devices are also typically constructed of plastic with a visually readable indicia of origin (i.e., VISA, MASTERCARD, etc.) and a magnetic strip. The magnetic strip typically contains an account number of the authorized user of the card. The magnetic strip may also contain a personal identification number (PIN) of the authorized user.

To use a credit card a user simply presents the card to a vendor as an indication of a request for credit. The vendor may simply run the card through an imprinter and ask the user to sign the imprint. The vendor may, in addition, call an issuing financial institution for an authorization number. In many cases, no attempt is made to verify that the user is, in fact, an authorized user.

Smartcards are also known. Smartcards attempt to solve the problem of storing PIN numbers on credit cards by encrypting the PIN number with other numbers such as a public key and/or a time of day and month. Further, an account number of an authorized user may also be encrypted with the same or a different public key as a further deterrent to decryption by an unauthorized user.

Upon receiving a smartcard, a cardreader of a vendor may first read an unencrypted name of an issuing credit card company followed by an encrypted account number of an account of the authorized user and PIN number. A modem interconnected with the vendor's card reader uses the unencrypted name of the issuing credit card company to establish a data link with the issuing credit card company. The modem then transmits the encrypted information to the issuing credit card company which then, using its own version of the public key, decodes the received information and provides an appropriate response.

While credit and smartcards are useful in avoiding the risks of carrying large amounts of cash, the use is associated with a certain amount of offline overhead. Once used, a bill is then forwarded to a user, who then typically issues a check in payment for his purchases. If the user does not remember his purchase, he may later need to sort through credit receipts to identify the purchase. If he cannot find the receipt, he may then need to write to the credit card company for verification of the purchase.

Further, when credit card bills are received, they are often misplaced. Often a user will forget to pay a credit bill within the time limit allowed for payment, thereby incurring additional charges. Accordingly, a need exists for a more efficient method of arranging for the payment of debt.

SUMMARY OF THE INVENTION

A method and apparatus are provided for executing payment of a debt by a person to a payee. The method includes the steps of negotiating payment terms with the payee and entering the negotiated payment terms into a payment scheduler. The method further includes the steps of determining by the scheduler that the payment is due on the debt in accordance with the payment terms, electronically instructing a third party to pay the debt due and electronically transferring a receipt of the payment to the person and payee and to a database of the person in a secure location, remote from the person.

DETAILED DESCRIPTION OF A PREFERRED EMBODIMENTS

Figure 1:
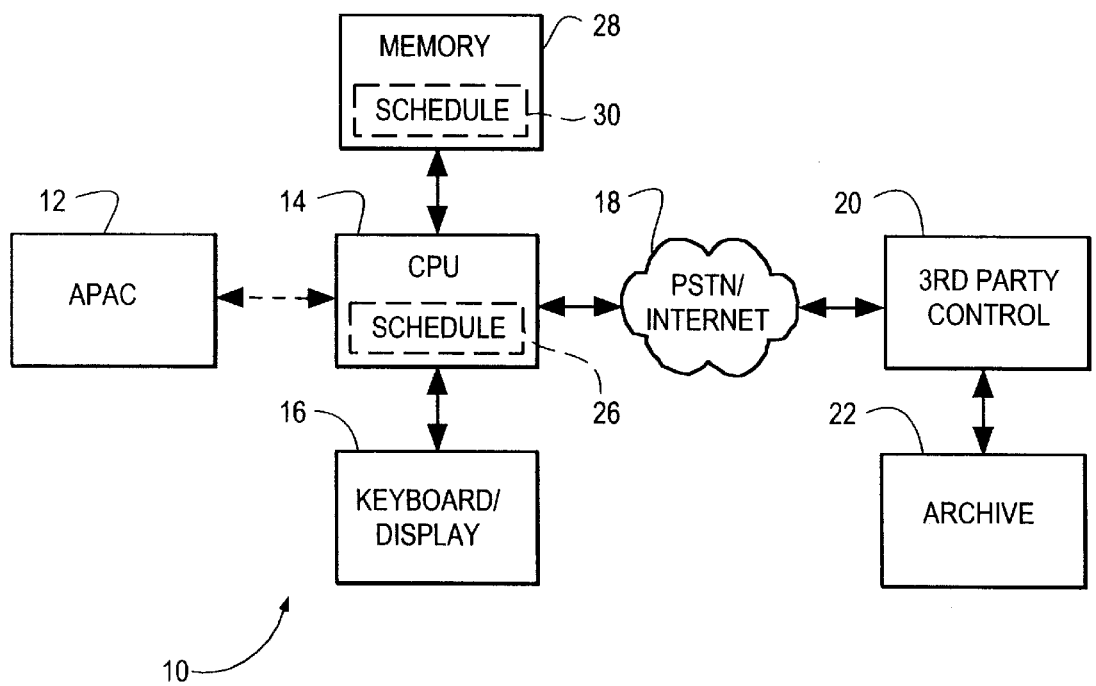
FIG. 1 depicts a system for payment of debt in accordance with an embodiment of the invention.

FIG. 1 is a block diagram of a payment system 10, generally, for executing payment of debts. Included within the system 10 is a central processing unit (CPU) 14 and a keyboard/display unit 16. Shown optionally connected to the system 10 is an automatic portable account controller (APAC) 12, such as a smartcard or that described in U.S. Pat. No. 5,591,949.

While it is believed that the utility of the system 10 lies primarily in its ability to facilitate payment of debt, the system 10 may also be used for the incursion of debt. The system 10 may incur debts directly or through operation of the APAC 12. For example, the APAC 12 may be used to purchase merchandise on credit and store a record of the transaction within an internal memory.

A keyboard of the APAC 12 allows memorandums to be created and associated with each purchase and stored in an internal memory of the APAC 12 along with the record of the purchase. Following use, the APAC 12 may be coupled to the CPU 14 as shown in FIG. 1 where a record of the transaction(s) may be downloaded and stored in a memory 28. Any agreed-upon payment dates may be loaded into a payment schedule 30.

To protect the integrity and viability of the purchase process, a number of electronic receipts may be created and retained in a number of diverse locations. The ability to create and maintain a number of substantially identical receipts adds to the security of the system 10, enhances the perceived reliability and reduces the risk to both user and vendor.

For instance, under one purchase scenario (e.g., as described in U.S. Pat. No. 5,591,949), the APAC 12 is coupled to a vendor's payment receiving system during which payment information is exchanged. Following receipt of the payment information, the vendor may transfer an electronic receipt to as many as four separate locations. First, the vendor 24 keeps a receipt of the transaction in his own system. Second, the vendor (using the routing information received from the APAC 12) sends an electronic receipt to the third party 20. A third receipt is transferred to the APAC 12 as part of the transaction. A final receipt (again using the routing information received from the APAC 12) may be sent to the CPU 14 of the user.

The transfer of the first and third receipt may be accomplished through a simple store routine by the vendor 24 and APAC 12 at the point of sale. The second and fourth receipts may be composed and forwarded by the vendor from the point of sale. Software within the vendor's system composes a summary of the transaction. The vendor sends the summary as a message through the Internet to both the third party 20 and to the CPU 14. Should a dispute arise, the vendor has not only his own receipt, also the receipt retained by the third party 20. The receipt stored in the CPU 14 of the user provides additional evidence of the transaction.

As a further option for the retention of receipts of transactions, the APAC 12 may also forward a copy of the receipt to an archive 22, either through the third party 20 or through a separate connection with the Internet 18. The availability of separately verifiable receipts in a number of locations precludes the possibility of fraud on the part of either user or vendor.

Under another alternative manner of use, the user of the system 10 may also incur debt from a remote location through use of the CPU 14. Where debt is incurred remotely, a receipt may be stored by the CPU 14 directly in memory 28. Other receipts may be forwarded from the vendor to the third party 20 or from the CPU 14 to the archive 22. The keyboard 16 of the CPU 14 may also be used to enter additional information about the transaction (e.g., a vendor's name, notes about the purchase, purpose of the purchase, etc.).

Figure 2:
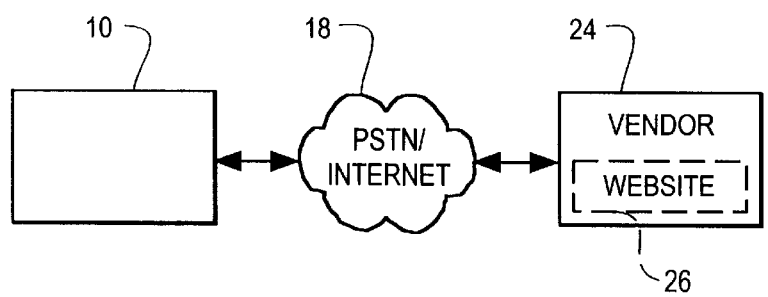
FIG. 2 depicts the system of FIG. 1 coupled to a vendor.

For instance, the CPU 14 may be used to access a website 26 of a vendor 24 (FIG. 2). The website 26 may provide information of a particular product sought by a user of the system 10. Upon examining the information provided by the vendor, the user may decide to purchase the product.

To facilitate a purchase by the user directly from the CPU 14, the vendor may provide an interactive webpage with provisions for entry of a product description or part number. Upon entry of an appropriate description, the user may select a "request quotation" softkey. The vendor may respond with a product cost and request for payment. The user may then negotiate payment terms.

Negotiation of payment may include one or more offers by the user (i.e., the buyer) of any of a number of purchase options. The buyer may offer payment by credit card, debit card, electronic check, extended check settlement (ECS) or any of a number of other purchase plans. The vendor 24 (i.e., the seller) may accept one of the payment offers made by the buyer, or may offer other alternatives (e.g., time payment plan, layaway, etc.).

As used herein, an electronic check differs from a debit card in that the debit card results in an instantaneous transfer of funds. In contrast, an electronic check is a promise of payment payable upon demand when a copy of the electronic check is presented to the third party 20 of the user. Credit card purchases are assumed to be payable within thirty days of receipt of a bill or later with additional finance charges.

ECS simply refers to a check with an agreed-upon presentation date. The buyer and seller may agree that the seller will not present the check for payment for some extended period (e.g., 30 days, 60 days, etc.). Presentation of the check outside the agreed-upon time periods may be regarded by the buyer as a breach and may be refused payment, absent new consideration from the seller.

To facilitate payment, the vendor 24 may provide the buyer with a webpage summarizing various acceptable payment options. The buyer may propose other options or select an offered mode of payment (e.g., credit card) and may enter any requested information (e.g., a credit card number).

Sensitive information (e.g., the credit card number or PIN number) may be transferred to the vendor under an encrypted format. Encryption may be by public key or any other appropriate format.

Where the offer is a credit card purchase, the vendor may receive the credit card number and separately request an authorization number from the credit card provider. The credit provider may decode any transferred information and respond accordingly. If the card were over a credit limit the provider may notify the vendor 24 and the vendor 24 may decline the purchase offer and request that the buyer select another form of payment.

In response, the buyer may select layaway. The vendor 24 may respond with a payment schedule showing a monthly payment amount and the number of payments required before the vendor would forward the merchandise. If the terms are acceptable to the buyer, the buyer activates a "PURCHASE" softkey to complete the transaction.

To complete the transaction, a number of data fields may be exchanged between buyer and seller. For example, the buyer may forward an identifier of a payment source 20 under the control of a third party. The vendor 24 may forward an identifier of a payment destination (which may be the same or a different third party). A unique transaction number may be generated by either the buyer or seller and associated with the transaction record of each party. Alternatively, a date and time-stamp and the names of the parties may be used as identifiers of the transaction.

The payment source 20 may be a credit card company, a bank, a credit union, a non-bank financial institution, or simply a clearinghouse created for payment of debts by electronic means. Similarly, the payment destination may also be a bank, credit union or clearinghouse for acceptance of payments. Where the third party 20 is a clearinghouse for payment of debt, it would be expected to be associated with a financial institution of sufficient financial stability to inspire confidence in the vendor. Where buyer and seller share the same entity, the payment would simply be an account transfer. Where the buyer and seller do not share the same entity, the financial stability of the third party 20 may be established by a policy from an appropriate private or public liability insurance carrier (e.g., from SIPIC, Lloyds of London, Metropolitan Life, etc.).

Upon completing the transaction, the user of the system 10 enters the payment schedule into a scheduler 26 within the CPU 14. Entry may be accomplished manually based upon the term forwarded by the vendor 24 or automatically by activation of the "¹PURCHASE" softkey. Upon presentation of the payment data, the payment scheduler accepts the payment date(s) and payment destination and enters the data into a payment schedule 30 in memory 28.

The user may also enter a record date and settlement date appropriate to the transaction. A record date is the agreed-upon date of payment. A settlement date is a time period within which the transaction will be honored based upon the circumstances. For instance, in the case of an ECS, the vendor 24 may deposit the ECS check in the U.S. Mail which may result in several days deviation on either side of the record date. For an ECS, the user may allow two or three days on either side of the record date within which the ECS will be honored. An electronic transfer may only be allowed one day for payment upon demand, except where a transaction was made late in the day (e.g., after 2 p.m.).

Each day, the scheduler 26 compares a current date with the payment schedule 30. Where a match is found, the scheduler 26 transfers a payment authorization to the third party payment controller 20.

The transfer of payments from source to destination accounts may be accomplished under any of a number of formats. For instance under a first format where buyer and seller have an ongoing relationship of trust (e.g., mortgagor, mortgagee), the transfer may be accomplished unilaterally by one side or the other. Alternatively, the transfer may be accomplished under a second format by receipt of an electronic demand for payment placed by the vendor 24 with the third party 20 and matched with an authorization for payment forwarded from the payment system 10.

In either case, the payment system 10 would electronically instruct the third party 20 to make a payment based upon terms of a prior agreement. Where the relationship was that of mortgagor/mortgagee, the underlying mortgage agreement would specify the payment terms.

To accomplish payment under the first format, the payment system 10 may perform a one-time transfer of authorization for monthly payments in the required amount. In response, the third party 20 may execute a monthly transfer to the mortgage holder or allow a monthly debit of the appropriate account.

Under the second format, the user of the system 10 would enter an amount of the payment and a payment date into the scheduler 26. On the payment date, the scheduler 26 would transfer a payment instruction to the third party 20. Upon matching the payment instruction to the payment demand, the third party 20 would transfer payment to the appropriate party.

To confirm payment of a debt (and to form a record of the transaction), the third party 20 transfers a receipt of payment to the payment system 10, to the vendor 24 and to an archive 22 in a secure location. The receipt transferred to the system 10 and vendor 24 confirms payment in accordance with the purchase agreement. The receipt held in the archive 22 forms a permanent record of the transaction.

Under one embodiment, the archive 22 is intentionally located remotely from either buyer or seller. While the archive 22 may be located in a facility of the third party 20, it may also be situated in a facility beyond the control of the third party 20 for purposes of additional security.

By using the system 10, a user may accumulate purchases over a time period and schedule payment according to any agreed-upon terms. Further by consolidating the payment of debt to a substantially single location, the user is much more able to maintain control over his financial condition.

For example, a user may schedule a monthly mortgage payment and may authorize the monthly payment without further action on the part of the user. As utility or credit card bills are received, the user may enter the payment amount and due date for payment. Other miscellaneous purchases, such as car repairs, medical bills or property taxes may be entered into the system 10 as bills are received and paid by the third party 20 in accordance with any agree-upon terms.

The third party 20 may pay the bills electronically as described above, or may generate a check in payment of the debt. Where the third party 20 generates a check, the check may be forwarded to the vendor through the U.S. Mail in a conventional manner.

By adding up purchases within a time period, the CPU 14 is much more able to present total expenditures to the user for a time period. Where the user enters his monthly income, the CPU 14 is able to present a clear picture of the user's financial condition, both near term and long term. Where a difference between the user's income and scheduled payments reaches some threshold difference, the system 10 may warn the user of a potential shortfall based upon the difference or may project a shortfall based upon additional historical expenses, such as utility or grocery bills.

A specific embodiment of a method and apparatus for controlling payment of debts according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of executing payment of a debt owed by a person to a payee, such method comprising the steps of:

negotiating payment terms between the person and the payee;

entering the negotiated payment terms into a payment scheduler;

determining by the scheduler that the payment is due on the debt in accordance with the payment terms;

electronically instructing a third party through a public access communication system to pay the debt due from an account of the person; and electronically transferring a receipt of the payment to the person and payee and to a database of the person in a secure location, remote from the person.

2. A method of executing payment of a debt owed by a person to a payee, such method comprising:

coupling an automatic portable account controller to a payment scheduler;

negotiating payment terms between the person and the payee;

entering the negotiated payment terms by the person into the payment scheduler;

determining by the scheduler that the payment is due on the debt in accordance with the payment terms;

electronically instructing a third party through a public access communication system to pay the debt due from an account of the person; and electronically transferring a receipt of the payment to the person and payee and to a database of the person in a secure location, remote from the person.

3. The method of executing payment as in claim 2 further comprising transferring a value in an amount of the debt from an account of the person to an account of the payee.

4. The method of executing payment as in claim 2 wherein the step of electronically instructing the third party further comprises transferring a transaction summary to the third party.

5. The method of executing payment as in claim 4 further comprising matching the transaction summary of the person with a transaction summary of the payee.

6. The method of executing payment as in claim 4 wherein the step of transferring a transaction summary to the third party further comprises including an account number of the payee in the transaction summary.

7. The method of executing payment as in claim 6 wherein the step of including an account number the payee in the transaction summary further comprises defining the account number as a wire transfer destination number.

8. The method of executing payment as in claim 2 wherein the step of negotiating payment further comprises accessing a website of a vendor and offering to make a purchase from the vendor.

9. The method of executing payment as in claim 8 wherein the step of offering to make a purchase from the vendor further comprises offering a first mode of payment to the vendor for the purchase.

10. The method of executing payment as in claim 2 wherein the step of negotiating payment further comprises accepting a vendor's standard payment terms and entering a payment date into the payment scheduler based upon the standard terms and receipt of a bill from the vendor.

11. The method of executing payment as in claim 2 wherein the step of negotiating payment terms with a payee further comprises closing a purchase transaction and transferring an electronic receipt from payee to the person, to the third party and to an archive of the person.

12. Apparatus for executing payment of a debt owed by a person to a payee, such apparatus comprising:
- means for negotiating payment terms between the person and the payee;
- means for entering the negotiated payment terms into a payment scheduler;
- means for determining by the scheduler that the payment is due on the debt in accordance with the payment terms;
- means for electronically instructing a third party through a public access communication system to pay the debt due from an account of the person; and
- means for electronically transferring a receipt of the payment to the person and payee and to a database of the person in a secure location, remote from the person.

13. Apparatus for executing payment of a debt owed by a person to a payee, the apparatus comprising:
- means for coupling an automatic portable account controller to a payment scheduler;
- means for negotiating payment terms between the person and the payee;
- means for entering the negotiated payment terms into the payment scheduler;
- means for determining by the scheduler that the payment is due on the debt in accordance with the payment terms;
- means for electronically instructing a third party through a public access communication system to pay the debt due from an account of the person; and
- means for electronically transferring a receipt of the payment to the person and payee and to a database of the person in a secure location, remote from the person.

14. The apparatus for executing payment as in claim 13 further comprising means for transferring a value in an amount of the debt from an account of the person to an account of the payee.

15. The apparatus for executing payment as in claim 13 wherein the means for electronically instructing the third party further comprises means for transferring a transaction summary to the third party.

16. The apparatus for executing payment as in claim 15 further comprising means for matching the transaction summary of the person with a transaction summary of the payee.

17. The apparatus for executing payment as in claim 15 wherein the means for transferring a transaction summary to the third party further comprises means for including an account number of the payee in the transaction summary.

18. The apparatus for executing payment as in claim 17 wherein the means for including an account number the payee in the transaction summary further comprises means for defining the account number as a wire transfer destination number.

19. The apparatus for executing payment as in claim 13 wherein the means for negotiating payment further comprises means for accessing a website of a vendor and offering to make a purchase from the vendor.

20. The method of executing payment as in claim 19 wherein the step of offering to make a purchase from the vendor further comprises offering a first mode of payment to the vendor for the purchase.

21. The apparatus for executing payment as in claim 13 wherein the means for negotiating payment further comprises means for accepting a vendor's standard payment terms and entering a payment date into the payment scheduler based upon the standard terms and receipt of a bill from the vendor.

22. The apparatus for executing payment as in claim 21 wherein the means for entering the payment terms further comprises an automatic portable account controller.

23. Apparatus for executing payment of a debt owed by a person to a payee, such apparatus comprising:
- means for negotiating payment terms between the person and the payee;
- a data input device adapted to enter the negotiated payment terms into a payment scheduler of the person;
- a schedule comparator adapted to determine that the payment is due on the debt in accordance with the payment terms;
- a payment processor adapted to electronically instruct a third party through a public access communication system to pay the debt due from an account of the person; and
- a receipt processor adapted to electronically transfer a receipt of the payment to the person and payee and to a database of the person in a secure location, remote from the person.

* * * * *

UNITED STATES PATENT AND TRADEMARK OFFICE
CERTIFICATE OF CORRECTION

| | | |
|---|---|---|
| PATENT NO. | : 6,298,335 B1 | Page 1 of 1 |
| APPLICATION NO. | : 09/195467 | |
| DATED | : October 2, 2001 | |
| INVENTOR(S) | : Robert Bernstein | |

It is certified that error appears in the above-identified patent and that said Letters Patent is hereby corrected as shown below:

Title page, item [63] under Related U.S. Application Data, should read as follows:

Continuation-in-part of Application No. 08/779,923 filed on January 6, 1997, now Patent No. 5,915,023, and is also a continuation-in-part of Application No. 08/369,749 filed on January 6, 1995, now Patent No. 5,591,949

Signed and Sealed this

Nineteenth Day of April, 2011

David J. Kappos
*Director of the United States Patent and Trademark Office*